United States Patent
Jain et al.

(10) Patent No.: US 10,803,078 B2
(45) Date of Patent: Oct. 13, 2020

(54) ABILITY TO GROUP MULTIPLE CONTAINER DATABASES AS A SINGLE CONTAINER DATABASE CLUSTER

(71) Applicant: Oracle International Corporation, Redwood Shores, CA (US)

(72) Inventors: Sanket Jain, Sunnyvale, CA (US); Kumar Rajamani, San Ramon, CA (US); Giridhar Ravipati, Foster City, CA (US); Jaebock Lee, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 805 days.

(21) Appl. No.: 15/331,534

(22) Filed: Oct. 21, 2016

(65) Prior Publication Data
US 2017/0116321 A1    Apr. 27, 2017

Related U.S. Application Data

(60) Provisional application No. 62/245,937, filed on Oct. 23, 2015, provisional application No. 62/395,267, filed on Sep. 15, 2016.

(51) Int. Cl.
*G06F 16/00* (2019.01)
*G06F 16/25* (2019.01)
(Continued)

(52) U.S. Cl.
CPC .............. *G06F 16/25* (2019.01); *G06F 16/21* (2019.01); *G06F 16/27* (2019.01); *G06F 16/951* (2019.01);
(Continued)

(58) Field of Classification Search
CPC .......... G06F 16/21; G06F 16/25; G06F 16/27; G06F 16/188; G06F 16/256; G06F 16/285; G06F 16/951
See application file for complete search history.

(56) References Cited

U.S. PATENT DOCUMENTS 6,185,699 B1    2/2001    Haderle
6,205,449 B1    3/2001    Rastogi
(Continued)

FOREIGN PATENT DOCUMENTS

WO    WO 2006/045844 A1    5/2006
WO    WO 2014/052851    4/2014
(Continued)

OTHER PUBLICATIONS

Kruglikov, U.S. Appl. No. 15/266,902, filed Sep. 15, 2016, Office Action, dated Aug. 6, 2018.
(Continued)

*Primary Examiner* — Diedra McQuitery
(74) *Attorney, Agent, or Firm* — Hickman Palermo Becker Bingham LLP

(57) ABSTRACT

In an approach, a database management system is configured in a manner that allows all pluggable databases within a cluster to be treated, from the perspective of a user, as though stored on a single container database, even when the pluggable databases are distributed across a plurality of container databases. When a command is received by a database server that is to be executed on all or a subset of the pluggable databases within the cluster, the database inspects mapping information replicated on all container databases within the cluster by a cluster synchronization server to determine which container databases store pluggable databases implicated by the command. The command is then forwarded to the database servers responsible for the determined container databases for execution. As a result, the
(Continued)

commands issued by the user can be agnostic in regard to the actual location of the pluggable databases within the cluster.

18 Claims, 5 Drawing Sheets

(51) Int. Cl.
*G06F 16/27* (2019.01)
*G06F 16/951* (2019.01)
*G06F 16/21* (2019.01)
*G06F 3/06* (2006.01)
*G06F 9/455* (2018.01)

(52) U.S. Cl.
CPC .......... *G06F 3/0664* (2013.01); *G06F 16/256* (2019.01); *G06F 2009/4557* (2013.01); *G06F 2009/45562* (2013.01); *G06F 2009/45587* (2013.01); *G06F 2212/151* (2013.01)

(56) References Cited

U.S. PATENT DOCUMENTS

| | | | |
|---|---|---|---|
| 6,226,650 | B1 | 5/2001 | Mahajan |
| 6,295,610 | B1 | 9/2001 | Ganesh |
| 6,804,671 | B1 | 10/2004 | Loaiza et al. |
| 7,305,421 | B2 | 12/2007 | Cha |
| 7,493,311 | B1 | 2/2009 | Cutsinger |
| 7,822,717 | B2 | 10/2010 | Kappor et al. |
| 8,117,174 | B2 | 2/2012 | Shaughessey |
| 8,364,648 | B1 | 1/2013 | Sim-Tang |
| 8,478,718 | B1 | 7/2013 | Ranade |
| 9,026,679 | B1 | 5/2015 | Shmuylovich |
| 9,122,644 | B2 | 9/2015 | Kruglikov et al. |
| 9,684,561 | B1* | 6/2017 | Yan .......................... G06F 16/27 |
| 9,684,671 | B1* | 6/2017 | Dorin .................. H04L 67/1097 |
| 2002/0112022 | A1 | 8/2002 | Kazar et al. |
| 2002/0143733 | A1 | 10/2002 | Mukkamalla |
| 2003/0061537 | A1 | 3/2003 | Cha et al. |
| 2004/0039962 | A1 | 2/2004 | Ganesh |
| 2004/0054643 | A1 | 3/2004 | Vermuri |
| 2004/0054644 | A1 | 3/2004 | Ganesh |
| 2004/0177099 | A1 | 9/2004 | Ganesh |
| 2004/0210577 | A1 | 10/2004 | Kundu |
| 2004/0267809 | A1 | 12/2004 | East et al. |
| 2005/0038831 | A1 | 2/2005 | Souder et al. |
| 2005/0149552 | A1 | 7/2005 | Chan et al. |
| 2005/0278276 | A1 | 12/2005 | Andreev et al. |
| 2006/0047713 | A1 | 3/2006 | Gornshtein |
| 2007/0100912 | A1 | 5/2007 | Pareek et al. |
| 2007/0118527 | A1 | 5/2007 | Winje |
| 2007/0244918 | A1 | 10/2007 | Lee et al. |
| 2008/0319958 | A1* | 12/2008 | Bhattacharya ........ G06F 16/242 |
| 2010/0185645 | A1 | 7/2010 | Pazdziora |
| 2010/0318570 | A1 | 12/2010 | Narasinghanallur et al. |
| 2011/0004586 | A1 | 1/2011 | Cherryholmes et al. |
| 2011/0060724 | A1 | 3/2011 | Chan |
| 2011/0087633 | A1 | 4/2011 | Kreuder et al. |
| 2011/0307450 | A1 | 12/2011 | Hahn et al. |
| 2012/0109926 | A1 | 5/2012 | Novik et al. |
| 2012/0284228 | A1 | 11/2012 | Ghosh |
| 2012/0287282 | A1 | 11/2012 | Lu |
| 2012/0323849 | A1 | 12/2012 | Garin |
| 2013/0080559 | A1* | 3/2013 | Rao .......................... H04L 43/10 709/208 |
| 2013/0085742 | A1 | 4/2013 | Barker et al. |
| 2013/0117237 | A1 | 5/2013 | Thomsen et al. |
| 2013/0198133 | A1 | 8/2013 | Lee |
| 2013/0212068 | A1 | 8/2013 | Talius et al. |
| 2014/0032525 | A1 | 1/2014 | Merriman et al. |
| 2014/0095452 | A1 | 4/2014 | Lee et al. |
| 2014/0095530 | A1* | 4/2014 | Lee ..................... G06F 11/1471 707/769 |
| 2014/0095546 | A1 | 4/2014 | Kruglikov et al. |
| 2014/0164331 | A1* | 6/2014 | Li .......................... G06F 11/1471 707/648 |
| 2014/0337336 | A1 | 11/2014 | Carlson |
| 2015/0032694 | A1 | 1/2015 | Rajarnani et al. |
| 2015/0120659 | A1 | 4/2015 | Srivastava |
| 2015/0120780 | A1* | 4/2015 | Jain ..................... G06F 21/6227 707/783 |
| 2015/0254240 | A1 | 9/2015 | Li et al. |
| 2015/0309831 | A1* | 10/2015 | Powers ............. G06F 16/24565 718/1 |
| 2017/0111477 | A1* | 4/2017 | Davis ..................... H04L 67/42 |
| 2017/0116278 | A1 | 4/2017 | Baby et al. |
| 2017/0116334 | A1 | 4/2017 | Kruglikov et al. |
| 2018/0075044 | A1 | 3/2018 | Kruglikov |
| 2018/0075086 | A1 | 3/2018 | Yam |

FOREIGN PATENT DOCUMENTS

| | | |
|---|---|---|
| WO | WO2014/052851 A1 | 4/2014 |
| WO | WO 2014/052851 A1 | 4/2014 |
| WO | WO 2014/145230 A1 | 9/2014 |

OTHER PUBLICATIONS

Yam, U.S. Appl. No. 15/266,917, filed Sep. 15, 2016, Advisory Action, dated Apr. 29, 2019.
Baby, U.S. Appl. No. 15/331,657, filed Oct. 21, 2016, Notice of Allowance, dated Mar. 4, 2019.
Yam, U.S. Appl. No. 15/266,917, filed Sep. 15, 2016, Final Office Action, dated Feb. 4, 2019.
Krugikov, U.S. Appl. No. 15/266,902, filed Sep. 15, 2016, Interview Summary, dated Feb. 20, 2019.
Krugikov, U.S. Appl. No. 15/266,902, filed Sep. 15, 2016, Final Office Action, dated Jan. 31, 2019.
Yam, U.S. Appl. No. 15/266,917, filed Sep. 15, 2016, Interview Summary, dated Oct. 19, 2018.
Kruglikov, U.S. Appl. No. 15/266,902, filed Sep. 15, 2016, Interview Summary, dated Oct. 1, 2018.
Baby, U.S. Appl. No. 15/331,657, filed Oct. 21, 2016, Office Action, dated Aug. 28, 2018.
Rajeev Kumar et al., "ORACLE DBA, A Helping Hand," Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle Base, Multitenant: Create and Configure a Pluggable Database (PDB) in Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud," 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Kruglikov, U.S. Appl. No. 15/331,525, filed Oct. 21, 2016, Notice of Allowance, dated Oct. 17, 2019.
Kruglikov, U.S. Appl. No. 15/331,525, filed Oct. 21, 2016, Interview Summary, dated Aug. 28, 2019.
Yam, U.S. Appl. No. 15/266,917, filed Sep. 15, 2016, Office Action, dated Jun. 21, 2019.
Kruglikov, U.S. Appl. No. 15/331,525, filed Oct. 21, 2016, Office Action, dated Jul. 25, 2019.
Baby, U.S. Appl. No. 15/331,540, filed Oct. 21, 2016, Office Action, dated Jul. 9, 2019.

(56) References Cited

OTHER PUBLICATIONS

Yam, U.S. Appl. No. 15/266,917, filed Sep. 15, 2016, Notice of Allowance, dated Jan. 6, 2020.
Krugikov, U.S. Appl. No. 15/266,902, filed Sep. 15, 2016, Notice of Allowance, dated Nov. 2, 2019.
Baby, U.S. Appl. No. 15/331,540, filed Oct. 21, 2016, Notice of Allowance, dated Nov. 14, 2019.

* cited by examiner

ABILITY TO GROUP MULTIPLE CONTAINER DATABASES AS A SINGLE CONTAINER DATABASE CLUSTER

PRIORITY CLAIMS AND RELATED APPLICATIONS

This application claims the benefit of U.S. Provisional Application No. 62/245,937, filed Oct. 23, 2015 and U.S. Provisional Application No. 62/395,267, filed Sep. 15, 2016; the entire contents of the aforementioned applications is hereby incorporated by reference for all purposes as if fully set forth herein.

FIELD OF THE INVENTION

The present invention generally relates to techniques for scaling the number of pluggable databases held within a container database. The present invention more specifically relates to a multi-node database management system that allows pluggable databases to be accessed as though held by a single container database even when the pluggable databases are distributed across a plurality of container databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by using a database client to submit commands to the database server that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is traditionally made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance". A database server may comprise multiple database instances, some or all of which are running on separate computers, including separate server blades.

Multitenant Architecture

A container is a collection of schemas, objects, and related structures in a multitenant container database (CDB) that appears logically to an application as a separate database. Within a CDB, each container has a unique ID and name. The root database and every pluggable database (PDB) is considered a container. PDBs isolate data and operations so that from the perspective of a user or application, each PDB appears as if it were a traditional non-CDB. Each PDB is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as tables. If data for a database object is stored in a tablespace, a database dictionary maps a database object to one or more tablespaces that hold the data for that database object.

The root container, also called "the root", is a collection of schemas, schema objects, and nonschema objects to which all PDBs within a particular CDB belong. Every CDB has one root which stores the system metadata required to manage all PDBs within the CDB. In some implementations, the root does not store "user" data but instead stores data that is common across the PDBs of the CDB, such as definitions for common users and roles, shared tables, code packages, and so forth. A PDB is a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

Scaling of Multitent Architecture

Multi-node database management systems increase the scalability of access to storage since each node can receive and process requests for operations to perform on the underlying container database in parallel. As a result, the system can withstand larger numbers of requests and additional nodes can be added to reduce strain if the system begins to become overloaded. However, as a practical matter, the number of PDBs stored within a CDB is limited due to various hardware and software limitations.

When additional PDBs are required over the maximum number, a new CDB must be established. However, when new CDBs are added, mechanisms must be implemented to allow the new CDB to be reached by the database clients. For example, the clients may have to connect to each CDB separately in order to issue the commands intended to be performed upon that CDB.

This can be inefficient and inconvenient when a user intends to execute a command across PDBs that span different CDBs. For instance, an administrator may desire to execute a command that will collect performance information or other metrics from all PDBs across all CDBs. In order to achieve this effect, the administrator may have to write a script to execute at a database client that will connect to each CDB in turn, collect the metrics, and store the metrics for analysis. In addition, even after such a script is created, the script would need to be continuously maintained in case the PDBs were ever moved to a different CDB. For example, in order to better distribute load across the CDBs, PDBs from container CDBs experiencing a high number of requests may be moved to CDBs experiencing a low number of requests. However, when a PDB is moved, the commands within the script need to be modified to identify the new location of the PDB, otherwise the requests would be sent to the original CDB which no longer stores that PDB.

As a result, it would be beneficial to have a DBMS that is capable of accessing a collection of PDBs as though they were held within a single CDB even when the PDBs may in fact be distributed across multiple CDBs.

DETAILED DESCRIPTION

Figure 1:
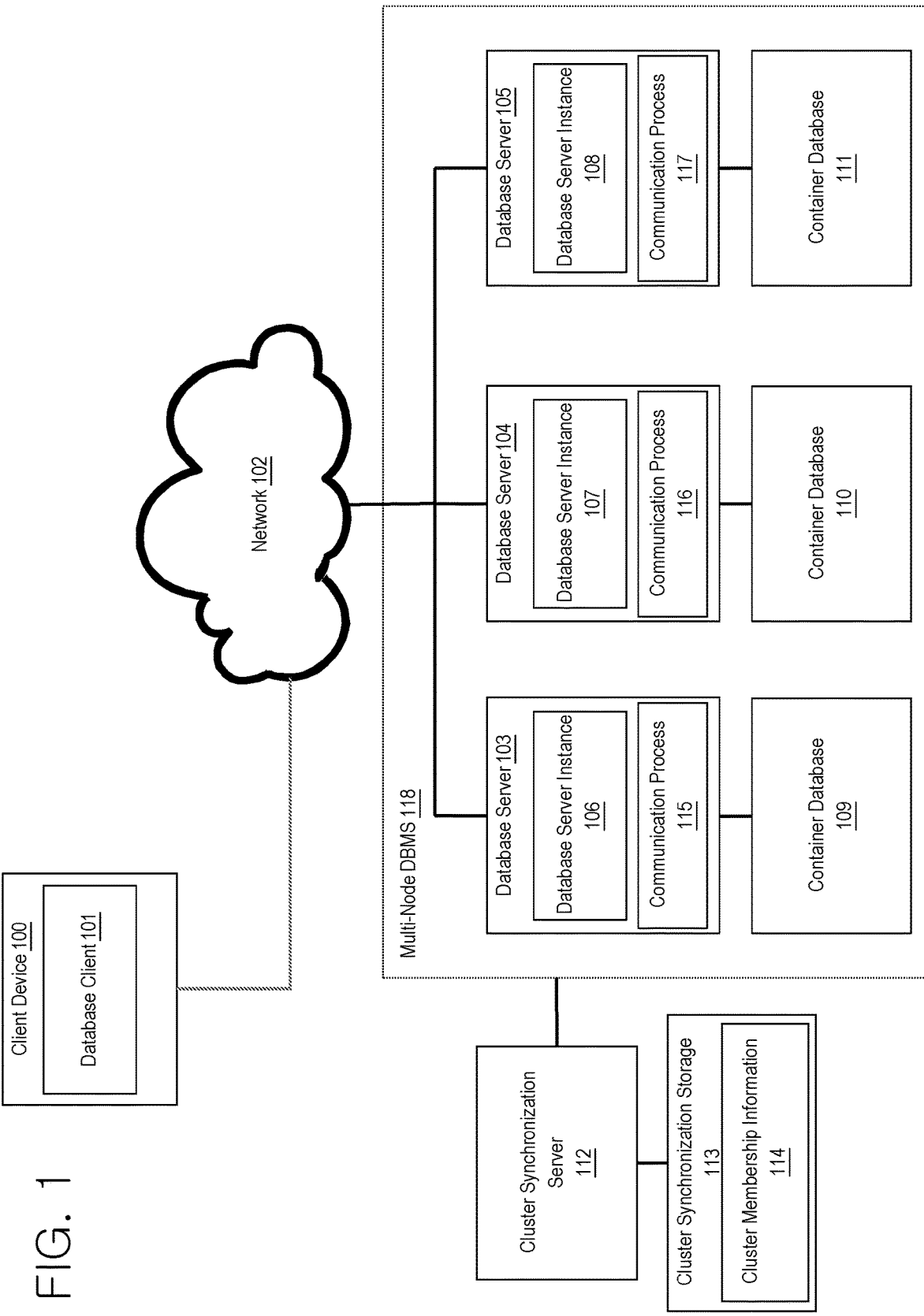
FIG. 1 illustrates an operating environment upon which an embodiment may be implemented.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The detailed description is laid out in the following sections:

1.0 General Overview
 2.0 Operating Environment
 3.0 Container Database
  3.1 Root Database
  3.2 Undo/Redo Records
 4.0 Initialization Process Flow
 5.0 Synchronization Service
 6.0 Command Process Flow
 7.0 Extensions with Application Root
 8.0 Container Queries and Optimizations
  8.1 Push Down of Predicates
  8.2 Push Down of Local Joins
  8.3 Push Down of Local Joins Based on Statistics
  8.4 Statistics Collection Techniques
  8.5 Executing Queries on Remote PDBs
 9.0 Hardware Overview
 10.0 Additional Disclosure 1.0 General Overview As discussed above, CDBs are restricted to a maximum number of PDBs due to various software and/or hardware limitations. As a result, when more PDBs are required than the CDB can efficiently store, a new CDB must be brought online to hold the excess PDBs. However, performing operations on a set of PDBs that span multiple CDBs poses significant challenges.

For example, an administrator may wish to execute a script via a database client that collects performance metrics from Pluggable Databases A and B stored on Container Database 1 and Pluggable Database C stored on Container Database 2. In order to achieve the desired effect, the script would have to cause the database client to connect to each CDB in turn, collect metrics from the PDBs stored within that CDB, and then compile the metrics into a table or other data structure for analysis. However, if the commands included in the script access a PDB by connecting to its associated CDB, then moving the PDB would cause the client to connect to the old location for the PDB rather than the new location. For instance, if Pluggable Database B were later moved to Container Database 2 for load balancing purposes, the script would no longer work due to referencing Pluggable Database B as being held within Container Database 1, when in fact Pluggable Database B is now held by Container Database 2. Thus, the command or set of commands would need to be updated to look for Pluggable Database B at its new location in Container Database 2. Performing this maintenance may be costly, but this cost can be mitigated if, from the perspective of the user, the multiple CDBs were logically treated as a single CDB that holds all the PDBs.

In some embodiments, a multi-node DBMS includes a number of database servers, each providing access to a respective CDB. Each of the CDBs stores a root database and one or more PDBs. The root database stores data and metadata that is shared across the PDBs and each of the PDBs stores data and metadata that is unique to that particular PDB. Both the root database and each of the PDBs stores a database dictionary that defines the database objects held by that respective database. In addition, the DBMS includes a cluster synchronization server that maintains membership information and metadata that maps each of the PDBs within the cluster to their respective CDB.

During initialization of a CDB, the database server associated with the container database sends a cluster identifier in a message to the cluster synchronization server. The cluster identifier is used by the cluster synchronization server to determine which cluster the associated CDB belongs, assuming that the cluster synchronization server is configured to service multiple clusters simultaneously. In the case where the cluster synchronization server only supports one cluster, the message carrying the cluster identifier may be replaced with a "hello" message or other handshake communication that requests membership. When the cluster identifier is received by the synchronization server, the synchronization server adds the CDB to the cluster.

In some embodiments, adding a new CDB to the cluster involves sending to the database server managing the new CDB mapping information that maps PDBs within the cluster to their respective CDB. For example, the mapping information may include a record for each PDB which includes the name of the PDB, the name of the CDB which holds the PDB, the network and/or port address of the database server providing access to the CDB, and so forth. In addition, the cluster synchronization server polls the database server to identify which PDBs are held by the associated CDB. The cluster synchronization server then sends those mappings to the other database servers within the cluster for storage in their respective CDBs. The mappings received by each database server in the cluster are stored within their respective CDBs, for instance as a table within a database dictionary or as separate control file.

In some embodiments, the cluster synchronization server continues to maintain the mappings and ensures that the CDBs within the cluster have a consistent and up-to-date view of which PDBs are held by which CDBs. There are many synchronization techniques that may be used for this purpose, such as sending periodic heartbeat messages to ensure all information on the CDBs is up to date or having the database servers send an update message to the cluster synchronization server whenever the membership of PDBs within the associated CDB changes. For example, the database server may receive a command to add or remove a PDB from its associated CDB. In response, the database server sends an update message to the cluster synchronization server which then updates its own mappings and sends the updated mappings to the other database servers within the cluster for storage within their respective CDBs. However, the exact manner in which synchronization is performed between the nodes of the multi-node DBMS is not critical and can be performed in numerous different manners without departing from the scope of this disclosure.

In order to execute commands against a CDB, a database client connects to either the root database or one of the PDBs directly. If the database client connects to one of the pluggable databases, the commands issued by the database client are typically confined to the data within that PDB. Thus, from the perspective of the database client, the PDB to which the client connects appears as a traditional database. However, since each PDB "belongs" to the root database, a command executed at the root may potentially affect any or all of the underlying PDBs. For example, a DBMS may implement a keyword for a command that causes the command to be executed on all PDBs within a CDB or on a specified subset of PDBs within the CDB. In some embodiments, the aforementioned functionality is implemented using a CONTAINERS clause in the SQL statement which, when wrapped around a database object (such as a table), indicates that the command should be applied to all instances of the database object across the containers of the CBD. For instance, the SQL statement "SELECT enam FROM CONTAINERS (scott.emp) WHERE CON_ID IN (45, 49)", indicates that the column "enam" should be selected from table "scott.emp" for all containers whose ID is 45 or 49.

However, commands such as the CONTAINERS clause are typically limited to accessing data within PDBs that are local to the CDB upon which the command was executed. To resolve this issue some DBMSs implement a feature referred to as a "database link". A database link is a pointer that defines a one-way communication path from one database to another. The database link allows a user of a first database to access and manipulate objects stored on another database. The database link is defined within the data dictionary table of a database and contains the information required to locate and connect to another database. For example, links to local databases (such as other PDBs within the same CDB) may specify the ID of the target database whereas links to remote databases may specify network information for the responsible database server (e.g. domain name, IP address, port number, etc.) as well as the ID number of the target database within the remote CDB. A database link connection is one-way in the sense that a client connected to local database A can use a link stored in database A to access information in remote database B, but users connected to database B cannot use the same link to access data in database A. If local users on database B need to access data on database A, then a link is defined in the data dictionary of database B that points to database A. Once a database link is established an object referred to by a SQL statement can be qualified with the name of the database link to indicate that the command is to be forwarded to the appropriate database server for execution on the linked database.

While features such as the CONTAINERS clause and database links are useful for compiling information from local and remote PDBs, the aforementioned features suffer from a lack of locational transparency. In other words, the SQL statements which use the aforementioned features must explicitly specify that the features are being used and supply/reference information that identifies how to reach the target database. For instance, the CONTAINERS clause identifies the database by ID and database links use the network information/database ID to which the link was bound when defined by the administrator. As a result, should the location of a PDB change after the application code which utilizes the aforementioned features has been written, the application code must be rewritten to use the proper mechanism and information for accessing the PDB at its new location.

For example, assume CDB1 includes {PDB1, PDB2} and the application code includes a SQL statement which uses a CONTAINERS clause to access the "emp" table of both PDBs. If at some later point in time PDB1 is relocated to CDB2 for load balancing purposes, the application code would no longer produce the intended effect since PDB1 is no longer a member of CDB1 and would not be accessible using the aforementioned SQL statement. Instead, the application code would have to be rewritten to use a database link to PDB1 to achieve the intended effect.

In some embodiments, to alleviate the aforementioned issue, the DBMS is configured in a manner that allows all PDBs to be treated, from the perspective of the user, as though stored by a single CDB. Thus, when a query or other command is received that is to be executed on all or a subset of the PDBs within the cluster, the database server to which database client connected inspects the mapping information received from the cluster synchronization server. The database server then performs a filtering step that identifies which CDBs within the cluster have PDBs that are relevant to or "implicated" by the command. For example, if a CONTAINERS clause with no predicate that limits its application to a particular set of PDBs is executed, the database server would consult the mapping to determine the network addresses for all database servers within the cluster, send the command to the identified database servers, receive the results of the execution of that command, compile the results, and send the results to the database client. However, if the CONTAINERS clause included a predicate that limited its application to a particular set of PDBs, the mapping is consulted to identify the CDBs which contain PDBs which are actually implicated by the command. The database server then sends the command to the databases servers providing access to the identified CDBs. CDBs which do not contain any of the PDBs relevant to the command do not need to receive and/or execute the command. Thus, pruning execution of the command prevents the servers responsible for CDBs which do not contain relevant PDBs from processing additional requests which would have no actual effect.

As a result of the aforementioned features, database clients can submit commands which identify only the PDBs, regardless of which CDB stores those PDBs or which database server provides access to the CDB. Thus, from the perspective of the user, the user is interacting directly with a single CDB that stores all the PDBs, even if those PDBs are in fact distributed across multiple CDBs within the cluster. Even if a PDB were to be moved from one CDB to another CDB, the synchronization service provided by the cluster synchronization server ensures that each database server in the cluster knows the current location of all PDBs. The command issued by the database client can be the same as before the move and the database server would intrinsically know where the PDB is located within the cluster and can forward the command accordingly. Furthermore, there is no need to perform maintenance on stored commands/scripts since the commands themselves do not need to be updated to reference the new location of a PDB after transport. One caveat to the aforementioned process is that each PDB must be uniquely identifiable (such as by a name or identification number) within the cluster, much as a unique identifier is required in the case of a single CDB holding a collection of PDBs. The unique identifier ensures that when a command references a particular PDB, that reference is unambiguous.

2.0 General Operating Environment

FIG. 1 illustrates an example computer-networking environment upon which an embodiment may be implemented. Although FIG. 1 only depicts a particular number of each element, a practical environment may have many more, perhaps hundreds or thousands, of each of the elements illustrated in FIG. 1. For example, a practical computer-networking environment may contain a plurality of database clients which send commands for execution by the multi-node DBMS 118, but to avoid obscuring the illustration only a single database client 101 is depicted in FIG. 1.

In FIG. 1, multi-node DBMS 118 includes database server 103, database server 104, and database server 105 (collectively "the database servers") that each represent a combination of software and resources on one or more computing devices that are communicatively coupled to their respective container database (container database 109, container database 110, and container database 111 respectively, referred to collectively as "the container databases" or "the CDBs") and are communicatively coupled to each other via network 102 and also to the database client 101 and cluster synchronization server 112. An example of a computing device upon which the database servers may be implemented is described below in the "Hardware Overview".

The database servers each execute a respective database server instance (database server instance 106, database server instance 107, and database server instance 108 respectively, collectively referred to as "the database server instances") which each represent an instance of a program executing on the database servers which accepts commands from the database client 101 and executes the commands on their respective container database. For brevity, the database servers are described in the examples below as performing actions. However, this description is intended as shorthand for the database servers performing those actions as a result of executing instructions or logic implementing their respective database server instances.

In addition, the database servers each have a communication process (communication process 115, communication process 116, and communication process 117 respectively, collectively "the communication processes") that handle communications between their respective database server instance and the client device 100, cluster synchronization server 112, and other database servers via network 102. For brevity, the database servers are described in the examples below as sending or receiving messages. However, the aforementioned description is intended as shorthand for the database instances receiving and sending messages via their respective communication process. In some embodiments, the communication processes are referred to as "listeners" and each listener listens for messages on a particular port and passes those messages to their corresponding database server instance for processing. Furthermore, in some embodiments, the database servers have a plurality of listeners that execute in parallel to send and receive messages for the corresponding database server instance.

In an embodiment, each of the CDBs represent a storage device, such as a collection of hard drive disks, tape storage, solid state storage devices, RAID storage, cloud storage systems, and so forth. Additional details regarding the structure of the CDBs is described below in Section 3.1 "Container Database".

In an embodiment, network 102 represents one or more local networks, wide area networks, internetworks, or service provider networks. In some embodiments, network 102 represents the Internet.

In an embodiment, the database client 101 represents a software program executing on a hardware client device 100 and is responsible for interfacing with the database servers to send commands that retrieve, modify, delete, or submit data and/or metadata stored by the CDBs. For example, the database client 101 may be configured to submit SQL commands to the database servers, such as DML, DDL, and query commands. An example of a computing device upon which the client device 100 may be implemented is described below in the "Hardware Overview".

In an embodiment, cluster synchronization server 112 represents a combination of software and hardware resources on one or more computing devices that ensure critical information is synchronized across the CDBs. The cluster synchronization server 112 is communicatively coupled to cluster synchronization storage 113, which represents one or more storage devices such as a collection of hard drive disks, tape storage, solid state storage devices, a RAID storage, cloud storage systems, and so forth. The cluster synchronization storage 113 stores cluster membership information 114 that represents mappings between PDBs that are members of the cluster and the location of those PDBs within the cluster. For example, an entry or record within the cluster membership information 114 may specify an identifier for a PDB, an identifier for the CDB that stores the PDB, a network address for the database server providing access to the CDB, a port address on which to contact the database server, and so forth. The cluster membership information 114 is replicated onto the container databases 109 by the cluster synchronization server 112 to ensure that the associated database server instances know where each PDB is located within the cluster. The cluster synchronization server 112 also ensures that the cluster membership information 114 is up-to-date and synchronized across all the CDBs within the cluster.

3.0 Container Database

Figure 2:
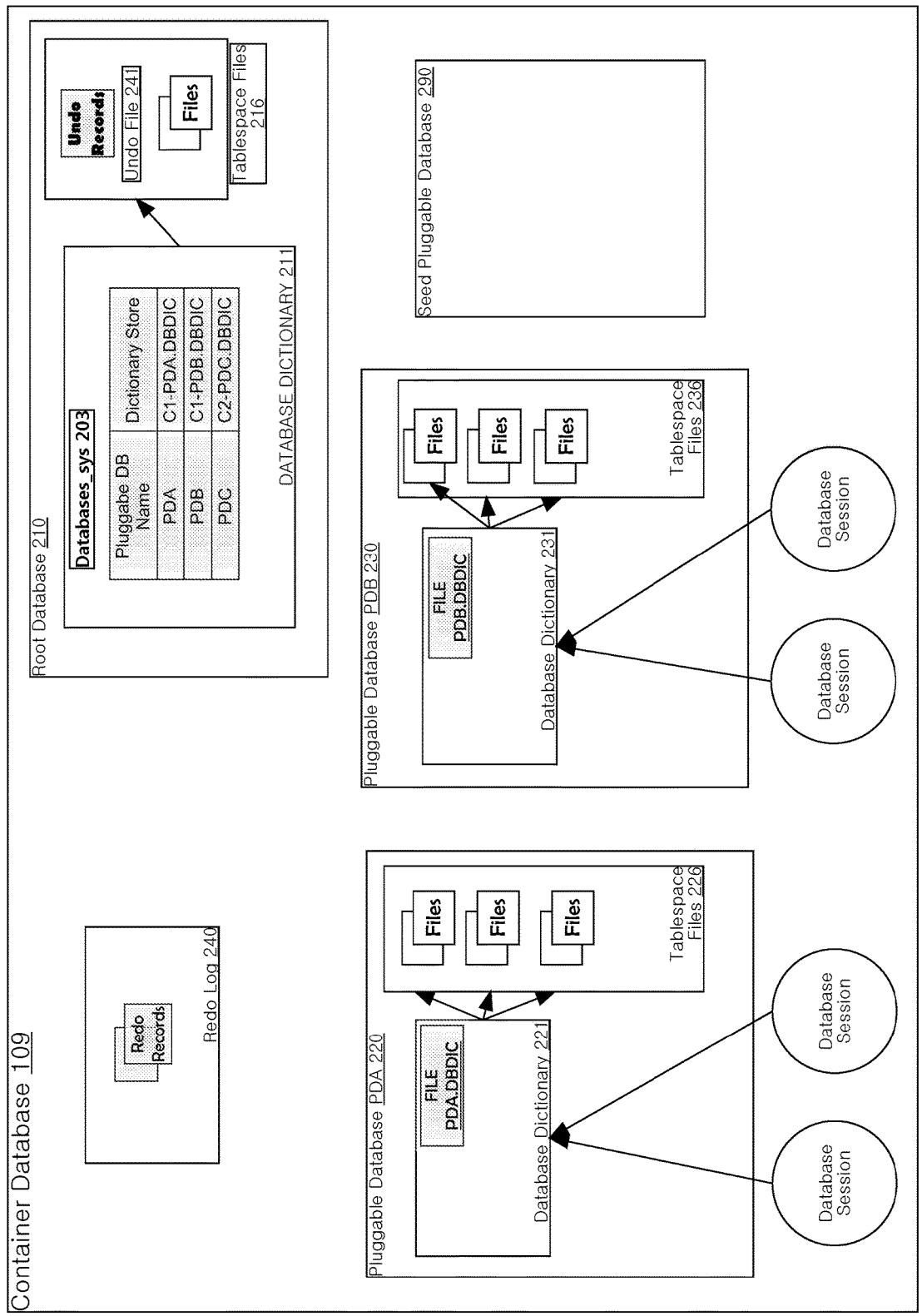
FIG. 2 illustrates an example logical structure of a container database according to an embodiment.

FIG. 2 illustrates an example structure for a general container database according to an embodiment. In order to illustrate clear examples, FIG. 2 is described with respect to container database 109, but the description also applies to container database 110 and container database 111 as well.

Container database 109 contains multiple databases that are hosted and managed by database server 103. The databases include pluggable database PDA 220, pluggable database PDB 230, and root database 210. In other embodiments, the container database 109 may contain more PDBs than the number of PDBs that are depicted in FIG. 2. However, due to inherent hardware limitations, some implementations set an upper limit on the number of PDBs that the container database 109 can support. Root database 210 is a database that is used by the database server 103 to globally manage container database 109, and to store metadata and/or data for "common database objects" that are accessible to users of the member PDBs.

Pluggable database PDA 220 includes database dictionary 221. Data for database objects of pluggable database PDA 220 is stored in tablespace files 226. Similar to user data, metadata for a database dictionary is stored persistently in a dictionary store. Metadata contained in database dictionary 221 is stored in file PDA.DBDIC.

Pluggable database PDB 230 includes database dictionary 231. Tablespace Files 236 store data for database objects of pluggable database PDB 230. Metadata for database dictionary 231 is stored persistently in file PDB.DBDIC.

The database server 103 responsible for the container database 109 may establish database sessions the root database 210 or any of the member pluggable databases. The database to which the database session connects determine the scope of the commands issued by the database client 101 (e.g. which database(s) the command will be executed on), which permissions are checked, which database dictionaries will be used for the session, and so forth.

3.1 Root Database

Root database 210 is a database used by the database server 103 to globally manage the container database 109. An important function facilitated by root database 210 is to define the PDBs held within the container database 109. Similar to PDBs, the root database 210 includes a database dictionary 211. The database dictionary of a root database may be referred to herein as a root database dictionary. Database dictionary 211 contains metadata that defines various aspects of the container database 109 needed to administer container database 109 and the PDBs contained therein. Data for database objects defined by database dictionary 211 is stored in tablespace files 216.

Database dictionary 211 includes database object Database_sys 303, which may be represented as a table. Database_sys 203 defines PDBs within the container database 109 and identifies PDBs stored on other container databases within the same cluster. Attributes of Database_sys 203 each describe an aspect or property of a PDB. The attribute Pluggable DB Name is a name or label for a pluggable database. The attribute Dictionary Store identifies a dictionary store that holds metadata pointing towards the database dictionaries of the member pluggable databases. One record in database dictionary 211 defines pluggable database PDA 220 and its dictionary store file PDA.DBIDC. Another record in database dictionary 211 defines pluggable database PDB 230 and its dictionary store PDB.DBIDC.

Databases_sys 203 also identifies pluggable database PDC which is not a member of container database 109. However, the Dictionary Store attribute identifies not only the name of the dictionary for the PDC, but also the CDB upon which PDC resides. In this case the CDB associated with the identifier "C2". As a result, when the database server 103 receives commands which implicates PDC, the Databases_sys 204 table can be consulted to identify the CDB to which the command needs to be forwarded. For example, the database dictionary 211 may store a separate table mapping CDBs to the network/port address of their respective database server which can then be used to forward the commands. As another example, the Databases_sys 204 table may include additional attributes which identify the network address/port address of the corresponding CDB. The aforementioned mappings represent the cluster membership information 114 that is replicated across the CDBs by the cluster synchronization server 112. However, the exact manner in which the mappings between PDBs and their respective CDBs is represented and stored is not critical and may be implemented in numerous different ways without departing from the scope of this disclosure.

In an embodiment, the database dictionary 211 defines common database objects that are shared or commonly used by the PDBs in container database 109. A common database object is defined in a pluggable database dictionary, which includes a reference to the common database object in the respective root database dictionary. Examples of common database objects include vendor supplied functions, utilities, tables, and views.

According to an embodiment, there are two types of common database objects: a metadata-linked object and an object-linked object. For both, metadata for the common database object is stored in the root database 210. However, for a metadata-linked object, data for the common database object, if any, is stored in a pluggable database. Thus, for a metadata-linked object, different pluggable databases may store different data for the same definition of a common database object. For an object-linked object, both the metadata and data for the database object are stored in the root database 210. Thus, data for this type of common database object is the same for all pluggable databases in the container database 109.

Seed pluggable database 290 contains database objects and a database dictionary. Seed pluggable database 290 is cloned to rapidly create a nascent pluggable database and facilitates fast provisioning of such pluggable databases. Seed pluggable database 290 contains a basic set of database objects that are commonly needed and/or used. For example, seed pluggable database 290 may contain database object links to common database objects and views for accessing the pluggable database dictionary and other system information.

3.2 Undo and Redo Records

Tablespace files 216 of the root database 210 include an undo file 241, which the database server 103 uses to store data and/or metadata ("undo records") related to transactions on the databases contained within container database 109. In some embodiments, the undo records store a before and after image of the data being modified during the transactions. For example, if during a transaction the Database Server 350 modifies a "STATE" column of a particular row to change the value from "OHIO" to "CALIFORNIA", the database server 103 also stores an undo record in the undo file 341 specifying the before value "OHIO", the after value "CALIFORNIA", and the location of the modification (e.g. the data block or blocks being modified). If a transaction needs to be rolled back, the database server 103 backtracks through the undo records to reverse any modifications the transaction had performed. The undo records may store metadata related to the state of the corresponding transactions, such as metadata indicating whether a transaction is active, has already committed, or is in the process of being rolled back.

Undo records can be used for a variety of purposes, such as rolling back transactions, recovering the database, providing read consistency, etc. In some embodiments, the undo file 241 is a finite size and thus the database server 103 may overwrite the undo records to save space as the transactions occur. For example, the segments storing the undo records may be reused after the corresponding transaction ends (e.g. by committing or being rolled back). However, in other embodiments, the database server 103 may retain the undo records for a period of time after the corresponding transactions have ended. For example, the undo records may be retained to provide read consistency for long running queries.

Container database 109 also includes redo log 240, which the database server 103 uses to store data and/or metadata ("redo records") related to modifications performed on the container database 109. For example, each time the database server 103 changes a data block of the container database 109, the database server 103 also stores a redo record in the redo log 240 that identifies the block(s) being modified and specifies the before/after values.

In some embodiments, the database server 103 identifies redo records based on the state of the database being modified. For example, the database server 103 may maintain a "system change number" (SCN) for the container database 109. The database server 103 increments the SCN each time a transaction commits on one of the underlying databases. The SCN is shared among the root database 210 and the pluggable databases. When the database server 103 generates a redo record, the redo record is tagged or otherwise associated with information identifying the database being modified and the corresponding SCN. Thus, the SCN serves to identify the state of the corresponding database at the time the redo record was created. In other embodiments, a timestamp may be used to the same effect.

The redo log 240, as a result, stores a stream of redo records that can be used by the database server 103 to replay modifications to the container database 109 when a recovery is required.

4.0 Initialization Process Flow

Figure 3:
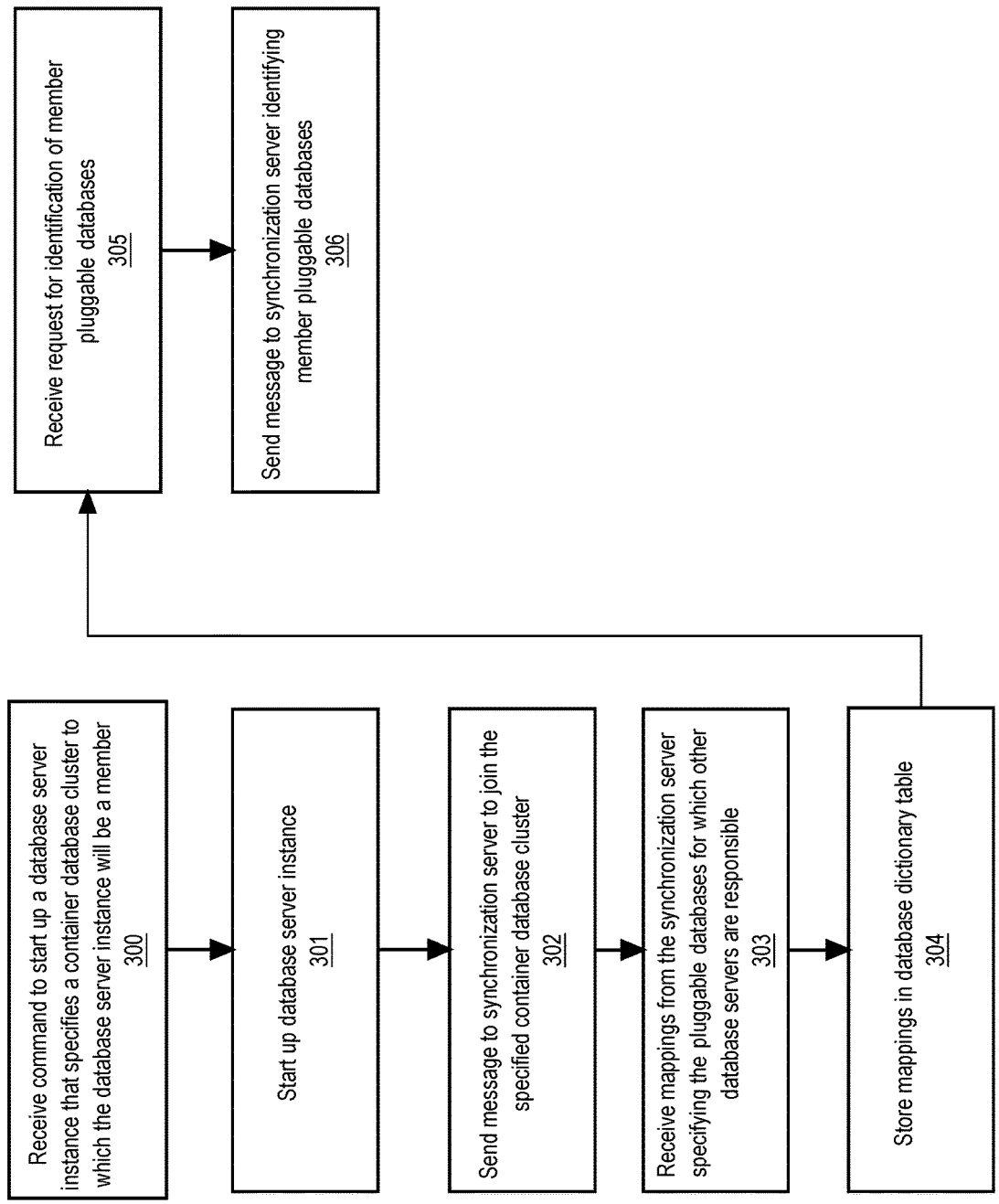
FIG. 3 illustrates a block diagram representing a process for starting up a database server instance for inclusion in a cluster according to an embodiment.

FIG. 3 illustrates an example initialization process flow for a database server according to an embodiment. In order to illustrate a clear example, the initialization process will be described from the perspective of database server 103 and with the assumption that database server 104 and database server 105 have already been initialized and are members of the cluster. Even though the steps described in reference to FIG. 3 may be presented in a particular order, other embodiments may perform the steps in a different order, merge steps, divide out steps into multiple sub-steps, perform steps in parallel, and so forth without departing from the scope of this disclosure.

In FIG. 3, at block 300, the database server 103 receives a command to start up the database server instance 106, the command specifying a container database cluster to which the database server instance 106 will be a member. In an embodiment, the command to start up the database server instance 106 is a command line interface or graphical user interface command which allows the user to specify an identifier for the cluster that the database server 103 and the associated container database 109 will join. To provide clear examples, the identifier used is assumed to be the identifier for the cluster to which database server 104 and database server 105 have already joined.

At block 301, the database server 103 starts up the database server instance 106. In an embodiment, the database server 103 executes a set of instructions which implements the database server instance 106. In the process of executing the database server instance 106, the database server 103 may allocate resources, such as memory and processor time, to executing the database server instance 106. The database server instance 106 is configured to receive commands from the database client 101, such as SQL commands, and execute the commands on one or more pluggable databases within the cluster specified at block 300.

At block 302, the database server 103 sends a message to the cluster synchronization server 112 requesting to join the cluster. In an embodiment, the message includes the identifier for the cluster specified at block 300. However, in some embodiments, the cluster synchronization server 112 may service only one cluster. In such cases supplying an identifier for the cluster may be unnecessary and the message carrying the identifier may be replaced with a "handshake" message or a generic message asking to join the cluster.

In response to receiving the message at block 302, the cluster synchronization server 112 sends a message to the database server 103 that includes the mappings between pluggable databases and container databases identified in the cluster membership information 114. For example, the message may identify each pluggable database within the cluster, the corresponding container database that holds the pluggable database, network/port information for the database server supporting the container database, and so forth.

At block 303, the database server 103 receives the mappings from the cluster synchronization server 112.

At block 304, the database server 103 stores the mappings in a table of the database dictionary 211. In an embodiment, the mappings are stored as one or more fields of the table Database_sys 203 of FIG. 2. However, in other embodiments the mappings may be stored in a separate table. Alternatively, to save space, the mappings may be stored across multiple tables, such as one table that identifies the container database to which each pluggable database in the cluster belongs and another table that maps container databases to the network/port address of the database servers that provide access to the container databases. The aforementioned technique prevents the network/port information for a container database from being stored multiple times. Furthermore, the mapping information may be stored in the root database 210 as data that is common or shared across the member pluggable databases. In yet other embodiments, the mappings may be stored as metadata in a data structure outside of the database dictionary 211 of the root database 210 or even outside of the root database 210. The exact manner in which the mappings are stored is not critical and may vary from implementation to implementation.

In an embodiment, in response to receiving the message requesting to join the cluster at block 302, the cluster synchronization server 112 also sends a message to the database server 103 requesting identification of the pluggable databases held by container database 109. However, in other embodiments the request may be sent in the same message as the one providing the mappings from the cluster membership information 114.

At block 305, the database server 103 receives the message requesting identification of the pluggable databases held by the container database 109.

At block 306, the database server 103 sends a message to the cluster synchronization server 112 that identifies the pluggable databases held by the container database 109. For example, the database server 103 may send a list identifying the name or other identifier of each pluggable database held by the container database 109. For instance, the database server 103 may send a message identifying Pluggable Database 220 and Pluggable Database PDB 230.

In response to receiving the message identifying the pluggable databases held by the container database 109, the cluster synchronization server 112 stores a mapping in the cluster membership information 114 for each of the identified pluggable databases associating the pluggable database with the container database 109 and the database server 103. After updating the cluster membership information 114, the cluster synchronization server 112 sends the updated mappings to the other database servers (database server 104 and database server 105) within the cluster, who then update their own database dictionary tables accordingly.

5.0 Synchronization Service

In an embodiment, the cluster synchronization server 112 runs a synchronization service for the database servers/container databases that are part of the same cluster. The primary job of the cluster synchronization server 112 is to ensure that the mappings stored in the cluster membership information 114 is up-to-date and is also replicated across the container databases.

There are numerous different techniques for implementing a synchronization service. In some embodiments, the cluster synchronization server 112 sends out heartbeat messages periodically which include the updates to the cluster membership information 114 to each of the database servers so that their respective database dictionary tables may be updated. In other embodiments, whenever one of the database servers experiences a change in pluggable database membership (e.g. pluggable databases being added or removed from a container database), that database server sends a message to the cluster synchronization server 112 identifying the change in membership. The cluster synchronization server 112 in response updates the cluster membership information 114 and disseminates the changes among the remaining database servers. In some embodiments, the cluster synchronization server 112 also keeps track of which database servers are online or off-line. For example, the aforementioned heartbeat messages may be used to determine whether a database server has gone offline by failing to respond within a threshold period of time. In such cases, the cluster synchronization server 112 may remove the mappings involving the associated container database and disseminate the changes among the other database servers.

The techniques described herein are agnostic with respect to the synchronization service provided by the cluster synchronization server 112. Provided that the service adequately keeps the cluster membership information 114 in sync across the container databases within the cluster, the exact manner in which the service is implemented is not critical and may vary from embodiment to embodiment.

6.0 Command Process Flow

Figure 4:
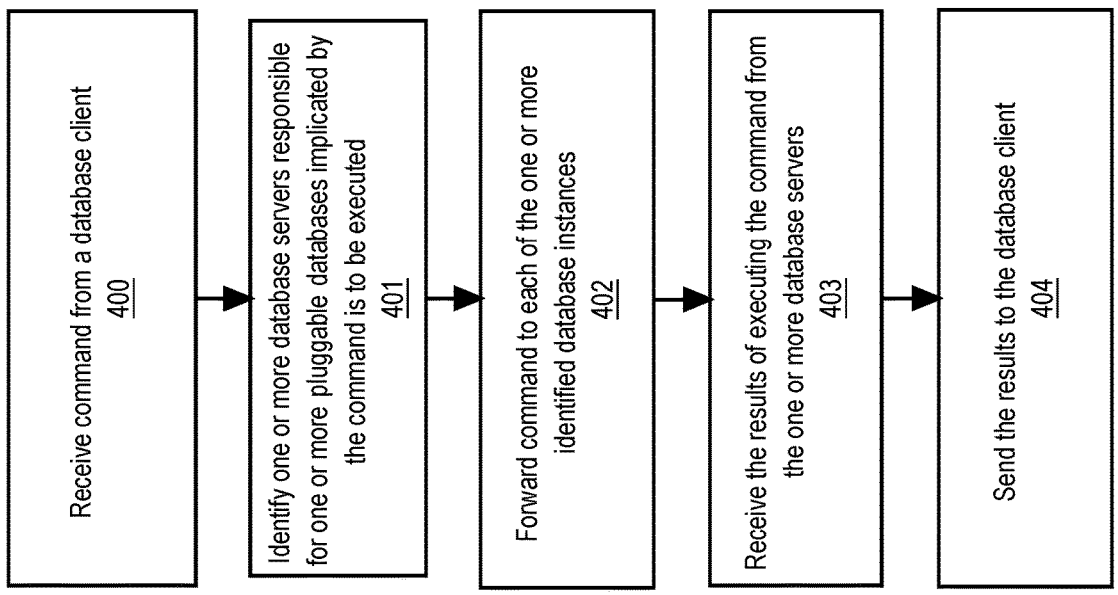
FIG. 4 illustrates a block diagram representing a process for executing a command received from a database client according to an embodiment.

FIG. 4 illustrates an example process flow for processing a command received by a database server according to an embodiment. In order to illustrate a clear example, the process will be described from the perspective of database server 103 and with the assumption that database server 104 and database server 105 have already been initialized and are members of the cluster. Even though the steps described in reference to FIG. 4 may be presented in a particular order, other embodiments may perform the steps in a different order, merge steps, divide out steps into multiple sub-steps, perform steps in parallel, and so forth without departing from the scope of this disclosure.

In FIG. 4, at block 400 the database server 103 receives a command from a database client 101. In some embodiments, the command received from the database server 103 includes a keyword that indicates that the command or part of the command is to be executed across multiple pluggable databases. For example, the command may use the CONTAINERS keyword described above in Section 1.0 to identify database objects for which the associated action is intended to execute on multiple pluggable databases. Furthermore, in some embodiments, the command may include one or more predicates which limit application of the command to a specific subset of pluggable databases within the cluster. However, the command may also use different formats than the CONTAINERS clause, such as commands which include keywords specifically intended to query metadata, such as metrics associated with each of the containers within the container database 109. For instance, the metrics may include the frequency with which certain columns or records are accessed, average time to process different types of commands, volume of commands serviced over a period of time, and so forth.

At block 401, the database server 103 identifies one or more database servers responsible for pluggable databases implicated by the command. In an embodiment, the database server 103 first identifies the pluggable databases which are implicated by the command. In some cases, all of the pluggable databases may be implicated, such as may be the case where a CONTAINERS clause is used without any predicates limiting the effect of the command to a specific subset of pluggable databases. In other cases, the command may specify a subset of pluggable databases upon which the command should be executed. Next, the database server 103 consults a table of the database dictionary 211 that represents the cluster membership information 114 to identify the database servers which are responsible for the identified pluggable databases. For example, the database dictionary 211 may store a table that identifies the network address and port address of the database server instances that corresponds to the identified pluggable databases.

At block 402, the database server 103 sends the command to each of the database servers identified at block 401. In an embodiment, the database server 103 uses the network address and port address of the database servers associated with the identified pluggable databases stored in the database dictionary 211 to forward the command to those database servers. In some embodiments, the command may be modified before being forwarded. For example, if the command included a predicate limiting application of the command to a subset of the pluggable databases, then the command may be modified to change the predicate to only reference pluggable databases known to be members of the container database associated with the database server instance to which the command is sent. Additional details regarding potential optimizations and transformations of queries is discussed below in more detail in Section 8.0 "Container Database Queries and Optimizations".

In some embodiments, the database servers may execute multiple database server instances which are responsible for different container databases. In such cases, the mapping information may also specify the database server instance responsible for providing access to a given pluggable database. In such embodiments, during block 402 the command is forwarded to the relevant database server instances. For example, the different database servers may have listeners which listen on different port addresses. Thus, the port address can be used to identify which database server instance is the intended recipient of the command.

In an embodiment, the database servers, upon receiving the command from database server 103, execute the command on the appropriate pluggable databases stored on their respective container databases. In some cases, such as when the command is a query, the database server instances will send results of executing the command back to database server 103. For example, in the case of queries the result may be rows which match one or more predicates specified by the query. In the case of other types of commands, such as DML or DDL commands, the result may be an acknowledgement that the command was successfully executed or an error message indicating that the command was not successfully executed.

At block 403, the database server 103 receives the results of executing the command from each of the database servers sent the command at block 402. In an embodiment, depending on the type of command received at block 400, the database server 103 may receive results such as rows satisfying a query, acknowledgments, negative acknowledgements, and so forth. However, if an embodiment implements commands which do not return results, the step at block 403 may be skipped.

In some embodiments, at block 403, the database server 103 may perform filtering and/or aggregation of the results received from each of the database servers. For example, in the case where the command is a query, as explained in more detail below in Section 8.0 "Container Database Queries and Optimizations", it may be more efficient in some cases to perform at least some of the predicate filtering at database server 103, rather than at each individual database server to which the command was forward. In many cases, database server 103 has a component referred to as a "query planner" or "query optimizer" that identifies the most efficient way to execute a query based on a variety of factors. Thus, at block 403, the database server 103 may have to apply predicates that are part of the query but not handled by the remote database servers. In addition, the command may specify that the data be returned in a specific format, such as sorting on one or more columns of the returned results. Thus, depending on the situation, the sorting may be performed at the other database server instances or at database server 103 depending on which path is more efficient. The database server 103 then aggregates the results from the other database servers and its own results if applicable.

At block 404, the database server 103 sends the results to the database client 102. However, in the case where there are no results generated through the execution of the command, the step at block 404 may be skipped.

7.0 Extensions with Application Root

Within a single CDB some embodiments introduce the concept of an "application root" to simultaneously manage multiple PDBs that are used by a common application. Additional details regarding application roots can be found in "APPLICATION CONTAINERS", U.S. application Ser. No. 15/331,525, by Andre Kruglikov et al., filed concurrently with the present application on Oct. 21, 2016, issued as U.S. Pat. No. 10,572,551 on Feb. 25, 2020, the entire contents of which is incorporated by reference for all purposes as though fully stated herein. Similar to the root of a CDB, an application root separates out the objects that are shared across multiple PDBs. While the root of a CDB stores information that is common to all the PDBs of the CDB (such as shared objects supplied by the developer of the DBMS), the application root is used to store objects that are shared across PDBs used by the same application. This is accomplished through the use of "data-linked" data, where the metadata defining the data and the data itself reside within the application root and "metadata-linked" data where the metadata defining the data resides within the application root and the data itself resides within the member PDBs. For instance, "data-linked" data may represent tables which are shared or common across all member PDBs and "metadata-linked" data may represent tables which share a common definition that is defined within the database dictionary of the application root, but records of the table differ between the member PDBs. As a result, the root of a CDB prevents duplication of shared definitions and objects across all the PDBs, whereas an application root prevents duplication of shared definitions and objects across PDBs used by a common application.

In addition, similar to how any PDB within a CDB can be accessed by establishing a session to the root database, establishing a session to an application root provides access to all the PDBs which are members of the application root. For example, a query that includes a CONTAINERS clause executed at the application root applies the query to all instances of the specified database object across the application root and its member PDBs, provided that the query does not include a predicate limiting the PDB IDs to which the query applies.

In some embodiments, to continue the experience that the user is interfacing with a single CDB, application roots created on one database are also mirrored on all CDBs within the cluster to prevent lengthy lookup times due to latency between the database servers. The "APPLICATION CONTAINERS" application also describes application root replicas that can be used to maintain consistency of application roots across multiple CDBs. This feature, combined with the processes described above in reference to FIG. 3 and FIG. 4, provides the user with the illusion that they are interfacing with a single CDB even when the commands are executed on an application root replicated across a plurality of CDBs. Furthermore, common definitions of database objects stored in the application root ensures that members of that application root have common database objects which can be queried using the CONTAINERS keyword.

8.0 Container Queries and Optimizations

Using keywords (such as the CONTAINERS clause discussed above), data in multiple PDBs can be queried during a database session with the root database. For example, the following query will return data from multiple PDBs, QA1: SELECT ename FROM CONTAINERS (emp)
    WHERE CON_ID IN (45, 49);

In some embodiments, the CON_ID column for the CONTAINERS clause is included in every row returned by the CONTAINERS clause and identifies the PDB from which each of the returned rows originated. In the above query, CON_ID identifies PDBs that are associated with IDs 45 and 49.

The query is executed by multiple processes running on the database server providing access to the container database using a parallel slave execution framework. The processes include a query coordinator process and one or more slave processes referred to herein as PQ (Parallel Query) slaves. A PQ slave that accesses a PDB executes within a session context for the PDB; the data dictionary of the PDB is attached to the session of the PQ slave.

In addition, the PQ slaves that access PDBs execute a recursive query generated based on the original query for execution against the PDBs. The recursive query may not be the same (or even semantically equivalent) to the original query. In some embodiments, the recursive query strips out predicates and/or keywords associated with executing the query across multiple PDBs and instead transforms the original query into a recursive query suitable for execution on a single PDB. For example, in the following recursive query QR1 may be generated for query QA1 and given to the PQ slaves, QR1: SELECT ename FROM emp;

The above QR1 is then executed by one or more separate sets of slaves against the PDBs associated with IDs 45 and 49.

8.1 Push Down of Predicates

In some embodiments, a filter predicate is "pushed down" by incorporating the predicate in a recursive query. For example, QA2: SELECT ename FROM CONTAINERS(emp) WHERE emp.age<18;
QR2: SELECT ename FROM emp WHERE emp.age<18

The predicate "emp.age<18" in QA2 is pushed down in recursive query QR2. As a result, the predicate will be checked by each PQ slave in parallel, rather than being performed serially by the query coordinator process. Since the original query lacked a predicate based on CON_ID, a recursive query QR2 is executed on all open PDBs implicated by the original query.

8.1 Push Down of Local Joins

In another embodiment, join operations may be pushed down for execution on a PDB by a PQ slave within the context of the PDB. For example, when CONTAINERS (DBA_VIEWS) and CONTAINERS (DBA_TABLES) are joined together, assuming that the rows are joined based on a match of the column CON_ID column of CONTAINERS( ), such joins may be completed locally within the context of the PDB. If such an equality predicate does not exist within the query, the join cannot be pushed down since the join would have to be performed across rows drawn from multiple different PDBs, which the query coordinator process would have to perform after receiving the result sets from the PQ slaves. In some embodiments, column CON_ID equality for joins is assumed by default since this case can be performed efficiently in parallel. Thus, the query coordinator process may implicitly add CON_ID equality or the slave processes may be configured to assume a predicate specifying that CON_ID equality exists. However, in such cases, a keyword may be supported to specifically indicate that the CON_ID equality predicate does not exist so as to not limit the types of queries that users can perform.

For example consider the query,

QA3:
select (*)
from containers(dba_tables) t, contianers(dba_views) v
where t.table_name=v.view_name
and t.con_id=v.con_id An alternative representation for the above query is QA3':

select count(*)
from containers(select t.table_name from dba_tables t, dba_views v
where t.table_name=v.view_name)

The statement within the containers clause is executed as a recursive query within a PDB (a PQ slave executing with the context of a PDB), in effect causing the local join on "t.table_name=v.view_name" to be performed locally within each PDB in parallel. The recursive query QA3' is generated in response to detecting the join based on CON_ID, in query QA3.

8.2 Push Down of Local Joins Based on Statistics

The push down of the join operation may be based on optimizer statistics collected for tables. In the case of multi-node DBMS 118, the statistics for the tables may be uploaded to the cluster membership information 114 of the synchronization server 112 by each respective database server for their associated container database and replicated across the other container databases within the cluster.

The following query references an object linked table dep for which the data is stored in an application root and a metadata-linked table emp for which the data is stored in each individual PDB. Assume that the optimizer statistics indicate dep is a small table and table emp is a large table. Based on the optimizer statistics, a local join is pushed for execution within the context of a PDB, as illustrated by the following queries.

QA4:
Select emp.name, dep.name from containers (emp), dep
where emp.dep=dep.id and dep.groupid=5

Here, the query coordinator process determines that dep is a small table and table emp is a large table in each PDB. As a result, it is advantageous to perform the joining at least partially locally within each PDB. An example recursive query that may be generated for performing the local joins is shown below:

QR4:
Select emp.name from emp wherein emp.dep IN (list_of_deps)

The recursive query returns all rows that join with a row in dep where "dep.groupid=5". The recursive query uses an in-memory data structure "list_of_deps" listing the id of each department having rows with "dep.groupid=5". Data for list_of_deps is generated by the application root and passed in via the recursive query.

Since multi-node DBMS 118 provides access to a plurality of container databases, each of which may be located remotely from one another, pushing down joins which reduce the cardinality of the results cause less records to be transferred over network 102. However, pushing down joins does not always cause the cardinality of the results to decrease. For example, if a cross join with no predicates were performed between a table with 1000 records and a table with 2000 records, the Cartesian product would result in 1000×2000=2000000 records that would need to be sent back to the database server which forwarded the commands. In such cases the query optimizer of the original database server which received the command would choose to not push down the join and instead execute the join once the results have been received. The decision of whether or not to push down a join is dependent on whether the result of executing that join increases or decreases the cardinality of the result compared to the raw tables. Which case is true for a given query is dependent on statistics, such as those described below in Section 8.4 "Statistics Collection Techniques".

8.3 Parallel Recursive Query

When the query coordinator generates an execution plan involving a cross-PDB query, the query coordinator decides a degree of parallelism (DOP, e.g. number of slaves). Anyone of these slaves may be assigned the work of executing a recursive query within the context of a PDB. A PQ slave assigned by the query coordinator that has the responsibility of executing a recursive query within the context of a PDB is referred to herein as a PDB slave.

A PDB slave may then decide on a DOP for executing a recursive query within a PDB. If a DOP greater than one is decided upon, the PDB slave becomes a query coordinator for multiple PQ slaves executing the recursive query. Thus, within one database server, a cross PDB query may be executed by multiple query coordinators, one operating within the context of a root or application root and one or more operating within the context of a PDB as a query coordinator coordinating the execution of multiple PDB slaves of a recursive query.

8.4 Statistics Collection Techniques

As discussed above, query coordinator processes rely upon accurate statistics in order to make determinations during a query plan, such as whether local joins should be pushed down into the recursive query or not. However, in the case of remote PDBs, statistics such as the size and distribution of tables and other database objects would ordinarily be stored within each respective PDB. This creates an issue where a database server needs to make decisions, such as deciding whether to push down joins, without the statistics for the remote PDB being available within the local CDB. This issue can be resolved in multiple ways. In one embodiment, the database server responsible for the remote PDB may periodically push statistics to the cluster synchronization server 112 for storage in the cluster membership information 114 or push the statistics to the cluster synchronization server 112 in response to certain triggers, such as records being updated, deleted, or added to the database objects. The cluster synchronization server 112 then ensures that the statistics are replicated onto all container databases within the cluster to ensure each database server has local access to the aforementioned statistics. Depending on the technique implemented by an embodiment, the statistics stored within each container database may not be perfectly in sync. However, even in such cases the statistics still provide an estimate that the query coordinator process can rely upon to develop a query plan.

8.5 Executing Queries on Remote PDBS

In some embodiments, when the original query implicates one or more PDBs that are located at a remote CDB (a CDB which is managed by another database server), the database server forwards the query to the database servers responsible for providing access to those PDBs as described above in reference to FIG. 4. However, depending on the implementation of the database server, the query may be transformed before being forwarded to the other database servers. Specifically, the query may be transformed to add predicates limiting application of the query to the PDBs implicated by the query which reside on the container database being managed by the database server receiving the transformed query. This transformation prevents the database servers receiving the query from attempting to execute a CONTAINERS clause in a never ending loop.

For example, assume a multi-node DBMS 118 as illustrated in FIG. 1 and consider the following query received at database server 103, QA2: SELECT ename FROM CONTAINERS(emp) WHERE emp.age<18;

The query above contains no predicate limiting the application of the CONTAINERS clause to any particular PDBs. Thus, when the database server 103 first receives this query, the database server 103 would consult the mappings stored in its database dictionary 211 to determine that the query needs to be forwarded to database server 104 and database server 105 for execution on the PDBs stored in their corresponding container databases. If the query is sent "as-is" the processing of that query would cause those database servers to in turn forward the command to the other database servers using the same process. This could potentially create a never-ending loop. However, if the database server 103 transforms the query by appending predicates which explicitly limit application of the query to PDBs stored within the respective container databases manages by database server 104 and database server 105, this would prevent those servers from continuing the loop. For example, the database server 103 may add predicates to the query which explicitly specify the IDs of the PDBs identified as belonging to database server 104 and database server 105 respectively based on the mappings stored in the database dictionary 211. As another example, the predicate may specify the ID of the respective container databases of database server 104 and database server 105, which would limit application of the query to PDBs within their own respective container databases.

The transformations described above lets database server 104 and database server 105 process the query in the same manner as receiving any other query from a database client. Thus, the database servers will not require special logic that is used to differentiate the case where the query is an original query received from the database client 101 and must potentially be forwarded for execution on remote PDBs vs. receiving the query from another database server which should only be executed on local PDBs. However, other embodiments may choose to implement the aforementioned special logic, for example maintaining a list of network addresses of other known database servers and using that list to determine when the query should be forwarded or only executed locally.

9.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
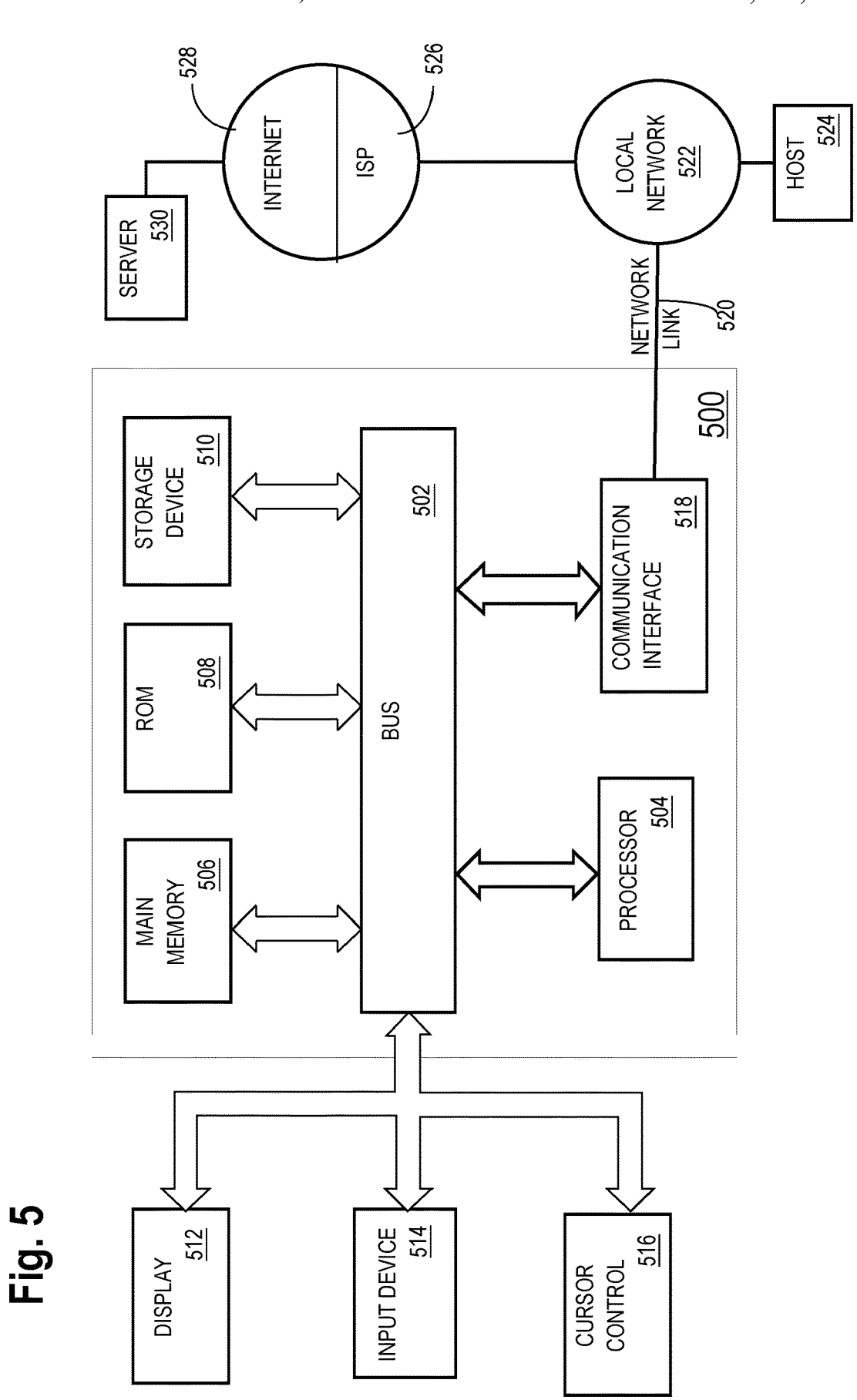
FIG. 5 is a block diagram that illustrates an example computer system upon which an embodiment of the invention may be implemented.

For example, FIG. 5 is a block diagram that illustrates an example computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10.0 Additional Disclosure

Additional embodiments are described in the following clauses:

1. A method comprising: receiving, at a database server of a plurality of database servers, a command from a database client to execute on one or more pluggable databases of a plurality of pluggable databases, wherein each pluggable database of the plurality of pluggable databases is held by a respective container database of a plurality of container databases, wherein each container database in the plurality of container databases is accessible via a respective database server of the plurality of database servers; identifying, by the database server, one or more database servers of the plurality of database servers which provide access to the one or more pluggable databases based on mapping information that contains a plurality of records, wherein each record of the plurality of records maps a given pluggable database of the plurality of pluggable databases to a database server of the plurality of database servers which provides access to a container database of the plurality of container databases which holds the given pluggable database; sending, by the database server, the command to the one or more database servers; receiving, at the database server, one or more responses from the one or more database servers that each include a result of executing the command; sending, by the database server, one or more messages to the database client, wherein the one or more messages includes data from the one or more responses.

2. The method of Clause 1, wherein the command is a query and further comprising: for each particular database server of the one or more database servers, prior to sending the command to the particular database server, transforming, by the database server, the command to add one or more predicates which limit application of the command to one or more pluggable databases held by the respective container database of the database server.

3. The method of any of Clauses 1-2, further comprising: prior to receiving the command, receiving, by the database server, a second command specifying to start up a new database instance that will be a member of a cluster associated with a particular identifier; in response to receiving the second command: generating, by the database server, the new database instance; sending, to a cluster synchronization server, a request to join the cluster, wherein the request specifies the particular identifier; sending, by the database server, to the cluster synchronization server, first information that maps pluggable databases held by the respective container database of the database server to the cluster synchronization server; receiving, by the database server, from the cluster synchronization server, second information that maps pluggable databases held by the respective container database of each other database server of the plurality of database servers that are members of the cluster; storing, by the database server, the second information as at least part of the mapping information.

4. The method of Clause 3, wherein the mapping information is stored within a database dictionary of a root database within the respective container database of the database server.

5. The method of Clause 3, further comprising: in response to receiving the first information, sending, by the cluster synchronization server, the first information to each other database server of the plurality of database servers that are members of the cluster.

6. The method of Clause 5, further comprising: store, by the cluster synchronization server, second information as at least part of cluster membership information that identifies, for each pluggable database in the plurality of pluggable databases, a corresponding container database of the plurality of container databases and a corresponding database server of the plurality of database servers, wherein the cluster synchronization server synchronizes the cluster membership information across each container database of the plurality of container databases that is a member of the cluster.

7. The method of any of Clauses 1-6, wherein the one or more pluggable databases is lesser in number than the plurality of pluggable databases.

8. The method of any of Clauses 1-7, wherein the command includes one or more keywords that indicate the command is to be executed on multiple pluggable databases.

9. The method of any of Clauses 1-8, wherein the command is a query that includes one or more predicates which limit application of the command to the one or more pluggable databases.

10. The method of any of Clauses 1-10, further comprising: in response to receiving the command from the database server, executing, by a second database server of the one or more database servers, the command on a set of pluggable databases of the one or more pluggable databases that are held by the respective container database of the second database server.

11. One or more non-transitory computer-readable media storing instructions that, when executed by one or more computing devices, causes performance of any one of the methods recited in Clauses 1-10.

12. A system comprising one or more computing devices comprising components, implemented at least partially by computing hardware, configured to implement the steps of any one of the methods recited in Clauses 1-10

What is claimed is:

1. A method comprising:
receiving, within a database session for a particular pluggable database at a database server of a plurality of database servers, a particular command from a database client to execute against two or more pluggable databases of a plurality of pluggable databases that include said particular pluggable database, wherein each pluggable database of the plurality of pluggable databases is contained by a respective container database of a plurality of container databases, wherein each pluggable database of said two or more pluggable databases is contained by a different container database of said plurality of container databases, wherein each container database in the plurality of container databases is accessible via a respective database server of the plurality of database servers;
wherein the particular command includes one or more keywords that indicate the particular command is to be executed against the two or more pluggable databases;
identifying, by the database server, one or more database servers of the plurality of database servers which provide access to the two or more pluggable databases based on the one or more keywords and mapping information that contains a plurality of records, wherein each record of the plurality of records maps a given pluggable database of the plurality of pluggable databases to a database server of the plurality of database servers which provides access to a container database of the plurality of container databases which holds the given pluggable database;

in response to receiving said particular command, sending, by the database server, one or more commands to the one or more database servers;

receiving, at the database server, one or more responses from the one or more database servers that each include a result of executing the one or more commands that includes one or more rows that satisfy one or more predicates specified by said particular command;

sending, by the database server, one or more messages to the database client, wherein the one or more messages includes data from the one or more responses.

2. The method of claim 1, wherein the particular command is a query and further comprising:

for each particular database server of the one or more database servers, prior to sending a respective command of said one or more commands to the particular database server, transforming, by the database server, the particular command to add one or more predicates which limit application of the particular command to two or more pluggable databases contained by a respective container database of said each particular database server.

3. The method of claim 1, further comprising:

prior to receiving the particular command, receiving, by the database server, a second command specifying to start up a new database instance that will be a member of a cluster associated with a particular identifier;

in response to receiving the second command:
generating, by the database server, the new database instance;
sending, to a cluster synchronization server, a request to join the cluster, wherein the request specifies the particular identifier;
sending, by the database server, to the cluster synchronization server, first information that maps pluggable databases contained by the respective container database of the database server to the cluster synchronization server;
receiving, by the database server, from the cluster synchronization server, second information that maps pluggable databases contained by the respective container database of each other database server of the plurality of database servers that are members of the cluster;
storing, by the database server, the second information as at least part of the mapping information.

4. The method of claim 3, wherein the mapping information is stored within a database dictionary of a root database within the respective container database of the database server.

5. The method of claim 3, further comprising:

in response to receiving the first information, sending, by the cluster synchronization server, the first information to each other database server of the plurality of database servers that are members of the cluster.

6. The method of claim 5, further comprising:

storing, by the cluster synchronization server, second information as at least part of cluster membership information that identifies, for each pluggable database in the plurality of pluggable databases, a corresponding container database of the plurality of container databases and a corresponding database server of the plurality of database servers, wherein the cluster synchronization server synchronizes the cluster membership information across each container database of the plurality of container databases that is a member of the cluster.

7. The method of claim 1, wherein the two or more pluggable databases is lesser in number than the plurality of pluggable databases.

8. The method of claim 1, wherein the particular command is a query that includes one or more predicates which limit application of the particular command to the two or more pluggable databases.

9. The method of claim 1, further comprising:

in response to receiving a respective command of the one or more commands from the database server, executing, by a second database server of the one or more database servers, the respective command on a pluggable database of the two or more pluggable databases that is contained by the respective container database of the second database server.

10. A non-transitory computer-readable storage medium storing one or more instructions, which when executed by one or more processors, cause:

receiving, within a database session for a particular pluggable database at a database server of a plurality of database servers, a particular command from a database client to execute against two or more pluggable databases of a plurality of pluggable databases that include said particular pluggable database, wherein each pluggable database of the plurality of pluggable databases is contained by a respective container database of a plurality of container databases, wherein each pluggable database of said two or more pluggable databases is contained by a different container database of said plurality of container databases, wherein each container database in the plurality of container databases is accessible via a respective database server of the plurality of database servers;

wherein the particular command includes one or more keywords that indicate the particular command is to be executed against the two or more pluggable databases;

identifying, by the database server, one or more database servers of the plurality of database servers which provide access to the two or more pluggable databases based on the one or more keywords and mapping information that contains a plurality of records, wherein each record of the plurality of records maps a given pluggable database of the plurality of pluggable databases to a database server of the plurality of database servers which provides access to a container database of the plurality of container databases which holds the given pluggable database;

in response to receiving said particular command, sending, by the database server, one or more commands to the one or more database servers;

receiving, at the database server, one or more responses from the one or more database servers that each include a result of executing the one or more commands that includes one or more rows that satisfy one or more predicates specified by said particular command;

sending, by the database server, one or more messages to the database client, wherein the one or more messages includes data from the one or more responses.

11. The non-transitory computer-readable storage medium of claim 10, wherein the particular command is a query, and wherein the one or more instructions, when executed by the one or more processors, further cause:

for each particular database server of the one or more database servers, prior to sending a respective command of said one or more commands to the particular database server, transforming, by the database server, the particular command to add one or more predicates which limit application of the particular command to two or more pluggable databases contained by a respective container database of said each particular database server.

12. The non-transitory computer-readable storage medium of claim 10, wherein the one or more instructions, when executed by the one or more processors, further cause:
  prior to receiving the particular command, receiving, by the database server, a second command specifying to start up a new database instance that will be a member of a cluster associated with a particular identifier;
  in response to receiving the second command:
    generating, by the database server, the new database instance;
    sending, to a cluster synchronization server, a request to join the cluster, wherein the request specifies the particular identifier;
    sending, by the database server, to the cluster synchronization server, first information that maps pluggable databases contained by the respective container database of the database server to the cluster synchronization server;
    receiving, by the database server, from the cluster synchronization server, second information that maps pluggable databases contained by the respective container database of each other database server of the plurality of database servers that are members of the cluster;
    storing, by the database server, the second information as at least part of the mapping information.

13. The non-transitory computer-readable storage medium of claim 12, wherein the mapping information is stored within a database dictionary of a root database within the respective container database of the database server.

14. The non-transitory computer-readable storage medium of claim 12, wherein the one or more instructions, when executed by the one or more processors, further cause:
  in response to receiving the first information, sending, by the cluster synchronization server, the first information to each other database server of the plurality of database servers that are members of the cluster.

15. The non-transitory computer-readable storage medium of claim 14, wherein the one or more instructions, when executed by the one or more processors, further cause:
  storing, by the cluster synchronization server, second information as at least part of cluster membership information that identifies, for each pluggable database in the plurality of pluggable databases, a corresponding container database of the plurality of container databases and a corresponding database server of the plurality of database servers, wherein the cluster synchronization server synchronizes the cluster membership information across each container database of the plurality of container databases that is a member of the cluster.

16. The non-transitory computer-readable storage medium of claim 10, wherein the two or more pluggable databases is lesser in number than the plurality of pluggable databases.

17. The non-transitory computer-readable storage medium of claim 10, wherein the particular command is a query that includes one or more predicates which limit application of the particular command to the two or more pluggable databases.

18. The non-transitory computer-readable storage medium of claim 10, wherein the one or more instructions further cause the one or more processors to:
  in response to receiving a respective command of the one or more commands from the database server, executing, by a second database server of the one or more database servers, the respective command on a pluggable database of the two or more pluggable databases that is contained by the respective container database of the second database server.

* * * * *

UNITED STATES PATENT AND TRADEMARK OFFICE
CERTIFICATE OF CORRECTION

PATENT NO. : 10,803,078 B2
APPLICATION NO. : 15/331534
DATED : October 13, 2020
INVENTOR(S) : Jain et al.

Page 1 of 1

It is certified that error appears in the above-identified patent and that said Letters Patent is hereby corrected as shown below:

In the Specification

In Column 3, Line 3, delete "Multitent" and insert -- Multitenant --, therefor.

In Column 16, Line 3, delete "CONTAINERS"," and insert -- CONTAINERS IN DATABASES", --, therefor.

In Column 17, Line 67, delete "contianers(dba_views)" and insert -- containers(dba_views) --, therefor.

In the Claims

In Column 24, Line 39, after "1-10" insert -- . --.

In Column 24, Line 42, in Claim 1, after "database session" insert -- established --.

In Column 26, Line 22, in Claim 10, after "database session" insert -- established --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*